United States Patent [19]

Manno

[11] Patent Number: 4,819,366
[45] Date of Patent: Apr. 11, 1989

[54] LEAD-HEADED JIG

[76] Inventor: Joseph T. Manno, Star Rte., Kane, Pa. 16735

[21] Appl. No.: 11,627

[22] Filed: Mar. 25, 1987

Related U.S. Application Data

[63] Continuation-in-part of Ser. No. 136,538, Dec. 22, 1987, abandoned, which is a continuation of Ser. No. 916,237, Oct. 7, 1986, abandoned.

[51] Int. Cl.⁴ .............................................. A01K 83/00
[52] U.S. Cl. .................................. 43/44.81; 43/44.83; 43/42.39
[58] Field of Search ................. 43/44.81, 44.83, 44.85, 43/44.84, 42.39, 42.49, 4, 43.16, 44.2

[56] References Cited

U.S. PATENT DOCUMENTS

| | | | |
|---|---|---|---|
| 497,962 | 5/1893 | D'Ivernois | 43/44.81 |
| 2,185,666 | 1/1940 | Hill | 43/44.81 |
| 2,825,173 | 3/1958 | Gederos | 43/44.2 |
| 2,926,454 | 3/1960 | Gottman | 43/44.83 |
| 2,989,817 | 6/1961 | Kepler | 43/42.39 |
| 3,550,306 | 12/1970 | Heitman | 43/44.2 |
| 3,750,321 | 8/1973 | McClellan | 43/42.39 |
| 3,839,814 | 10/1974 | Sykora | 43/44.2 |
| 3,869,821 | 3/1975 | McGahee | 43/42.49 |
| 4,280,296 | 7/1981 | Volenec | 43/44.81 |
| 4,535,562 | 8/1985 | Fry | 43/44.83 |

OTHER PUBLICATIONS

"Mister Twister" flyer, p. 25.

*Primary Examiner*—Kurt Rowan
*Attorney, Agent, or Firm*—Nixon & Vanderhye

[57] ABSTRACT

Leaded jig structures incorporating fish hooks are provided for knotless attachment to fine fishing lines. In each embodiment, first and second generally straight wire shank portions are provided on a metal wire hook structure, between which a lead weight is attached. The first and second shank portions are offset from each other with a connecting portion in between which forms an attachment point for the lead weight. The wire hook structure is provided with various open loop configurations for facilitating knotless attachment to strands. The rearward free end of the wire hook may be provided with a bait retaining barb. A second bait retaining barb may also be formed in the lead weight attached to the wire hook structure.

16 Claims, 2 Drawing Sheets

LEAD-HEADED JIG

RELATED APPLICATIONS

This application is a continuation-in-part of my copending parent application Ser. No. 07 136,538, filed Dec. 22, 1987, which is a File Wrapper Continuation of abandoned application Ser. No. 916,237, now abandoned filed Oct. 7, 1986, the entire disclosure which is hereby incorporated by reference.

BACKGROUND AND SUMMARY OF THE INVENTION

It has long been recognized that knotting of strands to relatively small structures is a delicate, time consuming procedure, and particularly the connection of fine fishing lines to small fish hooks. It is difficult for large segments of the population to properly thread or tie the line to the hook. Older people, those who are disabled, and children especially have great difficulty accomplishing such a task.

Over the years, there have been various proposals for the formation of a hook structure that can be attached to a line or strand without tying a knot. See, for example, U.S. Pat. Nos. 1,331,101 and 3,604,143. However, the hook structures disclosed therein are relatively complex and, as a result, their proposed structures have not enjoyed substantial commercial success.

In my own previous U.S. Pat. No. 4,294,031, a fish hook structure is disclosed which provides a T-shaped projection means along the shank portion of the hook in combination with an eyelet which permits a strand to be secured thereto without a knot. While such a structure is eminently practical, it is somewhat costly to manufacture, and therefore it does not represent a particularly satisfactory solution to the problem.

According to the present invention, an integral attachment structure is provided for knotless attachment to a strand, the structure characterized by simplicity of design and ease of manufacture. That is, although as useful as the structure in U.S. Pat. No. 4,294,031, it is simpler and easier to manufacture. It will be understood that the structure has applicability not only in the design of fish hooks per se, but it may be also incorporated into the design of spinners, plugs, various types of fishing lures, and to other environments where a strand must be easily but securely attached to another component.

In accordance with this continuation-in-part application, the features of the fastening structure of my earlier filed parent application Ser. No. 916,237 are applied to lead-headed jigs as further described hereinbelow.

Lead-headed jigs are a type of fish hook structure which typically includes a lead weight shaped in the form of a lead ball, small fish, fish head, insect, or the like which provides weight to the structure. The lead weight is also formed with a closed eyelet for knotted attachment to a fishing line.

In each of the embodiments in accordance with this invention, first and second straight shank portions of a wire hook structure are provided between which a lead weight (which may be of any suitable shape, such as a ball or the like) is attached. The first shank portion of the wire is that portion between the forward hook and the lead weight, while the second shank portion lies between the weight and the rearward free end of the structure. A connecting portion of the wire extends through the lead weight. Additional structure is provided on the wire, with or without cooperating structure on the lead ball, to enable, in each case, knotless attachment of a strand to the jig.

In one embodiment, a wrapping projection is formed on a ball-shaped lead weight and this projection, along with the second shank portion and a substantially closed loop portion formed on the wire hook, provide the required structure for achieving knotless attachment.

In a second embodiment, the second shank portion of the wire hook is doubled back to form a loop which terminates in a bent free end which engages or is spaced only very slightly from a projection formed on a lead ball to enable a looped strand to be drawn into the wire loop and thereafter wrapped a number of times about the ball projection.

In still another embodiment, a lead ball is provided without any projection, so that a strand would normally be looped around the forward end of the ball, wrapped a number of times around the second shank portion, and drawn into a substantially closed loop formed at the rearward free end of the hook structure.

In still another embodiment, a double open loop arrangement is formed in the hook structure forward of a lead ball in the first shank portion so that a strand may be pulled into the forwardly facing loop and thereafter wrapped around the second shank portion and drawn into a substantially closed loop formed at the rearward free end.

In another embodiment, a rearwardly opening loop is formed in the wire structure as it exits from a lead ball immediately adjacent the second shank portion, so that a strand may be drawn around and below the loop, i.e., between the loop and the lead ball, and thereafter wrapped around the second shank portion and threaded through a substanially closed loop as previously described.

In still another embodiment, an attachment loop is formed as the wire exits from a lead ball formed with a wrapping projection thereon. The free end of the wire in this embodiment is directed toward the hook at the forward end of the wire structure and turned back at its free edge to form a barb to hold bait such as a worm thereon in spaced relationship to, but in general alignment with, the hook at the forward end of the structure.

In a still further embodiment, an attachment loop is formed as the wire exits from an irregularly shaped lead weight formed with a worm retaining barb thereon which cooperates with another bar formed at the rearward free end of the wire structure.

DETAILED DESCRIPTION OF THE DRAWINGS

Figure 1:
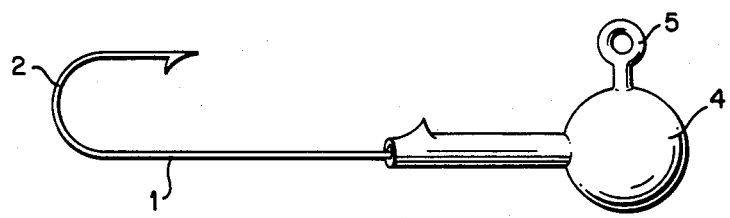
FIG. 1 illustrates a conventional prior art leaded jig structure.

Referring now to FIG. 1, the prior art leaded jig structure is illustrated therein, including a straight shank portion 1, hook portion 2 forward of the straight shank portion, and a leaded ball element 4 provided with an integrally formed, closed eyelet 5. This prior art jig is typical of prior art devices which include an eyelet for attaching the jig to a strand with a knot. It is this type of prior art device over which this invention constitutes an improvement.

Figure 2:
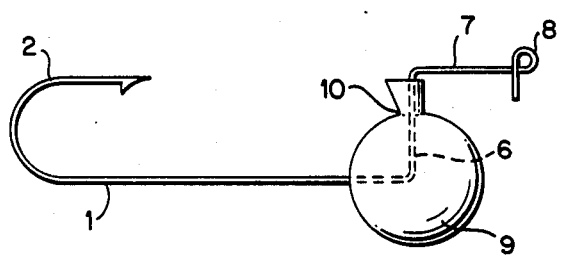
FIGS. 2-8 illustrate side views of various leaded jig structures in accordance with exemplary embodiments of this invention described in detail below.

Turning now to FIG. 2, a leaded jig in accordance with an exemplary embodiment of this invention is shown which, at its forward end, includes a first, generally straight metal wire shank 1 and a hook 2 as in the prior art devices. However, the hook structure is formed with a second, generally straight shank portion 7 which is offset from the first shank portion 1 and connected thereto by a connecting portion 6. A lead weight 9 is attached to the structure generally in the area of the intersection of first shank portion 1 and connecting portion 6. It will be appreciated that the lead weight may be in the general shape of a ball, or in any other suitable shape.

In the FIG. 2 embodiment, lead ball 9 has an integrally formed wrapping projection 10, adjacent the second shank portion 7 and through which the connecting portion 6 extends.

To attach a strand to the structure illustrated in FIG. 2, the strand may be looped over the projection 10, wrapped several times around the second shank portion 7 and thereafter drawn into the substantially closed loop without threading 8 to provide a secure, knotless attachment. The substantially closed loop 8 terminates in a rearward end portion which overlies the second shank portion 7.

Figure 3:
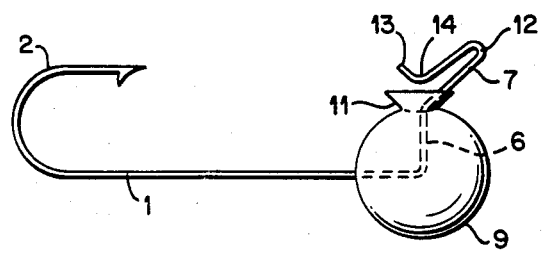

With reference to FIG. 3, a leaded jig structure is disclosed which contains a generally straight shank portion 1 and a hook 2 similar to that disclosed in FIG. 2. In addition, a similar connecting portion 6 is provided for connecting first shank portion 1 and second shank portion 7. The second shank portion 7, however, is not parallel to the first shank portion, but extends away from the first shank portion at an acute angle, e.g., 30°–45°. The lead ball 9 is anchored to the structure as in the previously described embodiment.

In the FIG. 3 embodiment, a slightly different wrapping projection 11, having a substantially inverted cone-shape, is provided on the ball 9. The second shank portion extends along the surface of the projection 11 and is thereafter bent back to form a loop 12 which directs the wire back toward the lead ball 9. The wire terminates in an upwardly bent portion 13 which engages, or which is only very slightly spaced from, the lead ball projection 11 at the bend 14. In this embodiment, a stand may be doubled back on itself to form a loop which is drawn into the wire loop 12 through the narrowed bend portion 14, and thereafter wrapped several times about the projection 11.

Figure 4:
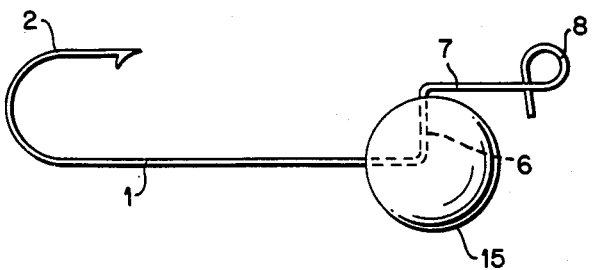

Referring now to FIG. 4, there is disclosed a jib structure similar in all respects to that disclosed in FIG. 2 but wherein the lead ball 15 has no integrally formed wrapping attachment. In this embodiment, a strand may be looped around the first shank portion 1 and drawn against the forward end of the ball 15, and thereafter wrapped around the second shank portion 7 and drawn into the substantially closed loop 8.

Figure 5:
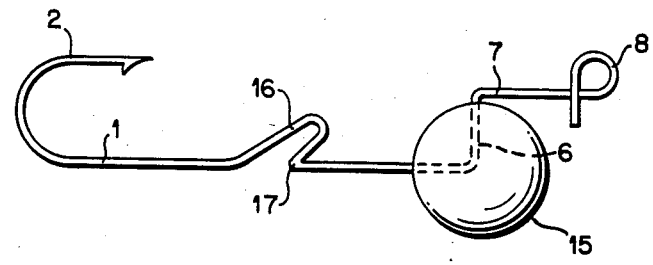

In FIG. 5, there is disclosed still another exemplary embodiment of the invention. In this embodiment, a double open loop configuration 16, 17, is formed in the first shank portion 1 forward of the lead ball 15. Loop 16 is open in a generally forward direction while loop 17 opens generally toward the rear of the hook structure. Otherwise, the wire hook structure and the lead ball itself are identical to that disclosed in FIG. 4 as described hereinabove. A looped strand may be drawn into the wire loop 16, and thereafter wrapped about the second shank portion 7 and drawn into the substantially closed loop, thereby securely fastening the strand to the structure without having to tie any knots and without having to thread the strand through any closed eyelets 8.

Figure 6:
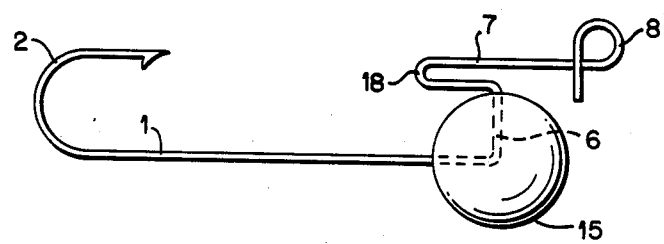

In FIG. 6, a leaded jig structure is disclosed wherein a rearward opening loop 18 is formed in the wire at a point where it exits the lead ball 15 and merges into the second shank portion 7. The jig structure is otherwise similar to the embodiment illustrated in FIG. 4. Here, however, a strand loop may be drawn over the loop 18 so as to be wedged between the ball 15 and the loop 18, and thereafter wrapped around the second shank and drawn through the loop 8 as previously described.

Figure 7:
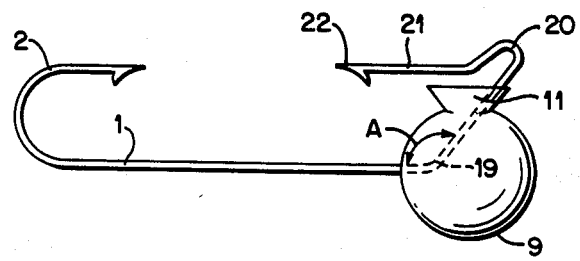

In FIG. 7 there is disclosed a lead-headed jig structure provided with a separate bait retainer. In this embodiment, a lead ball 9 is anchored to the wire structure at a location where connector portion 19 extends from the first shank portion 1 at an obtuse angle A. The lead ball 9 is also provided with an inverted conical wrapping projection 11 as in the FIG. 3 embodiment. As the wire exits the lead ball, and specifically, the projection 11, it is shaped to form a loop 20 somewhat similar to the loop 12 in FIGURE 3. The wire then is directed forwardly toward the hook 2 along a second shank portion 21, and terminates in a bait-retaining barb 22. The second shank portion 21 extends along a portion of the projection 11, separated therefrom by a distance preferably less than the thickness of a strand. The bail retainer, or keeper, arrangement of this embodiment is particularly advantageous in that the relatively large barb 22, formed by a bent over portion of the wire, allows a greater puchase on the head of a worm or other bait so as to hold it securely in place. In addition, a large open area is provided between the wire barb 22 and the fish hook 2 so as to facilitate hooking of the fish. As with the other embodiments of this invention, the wrapping projection on the ball 9 and the loop 20 facilitates knotless attachment of a strand to the jib much in the same manner as described in connection with the embodiment illustrated in FIGURE 3.

Figure 8:
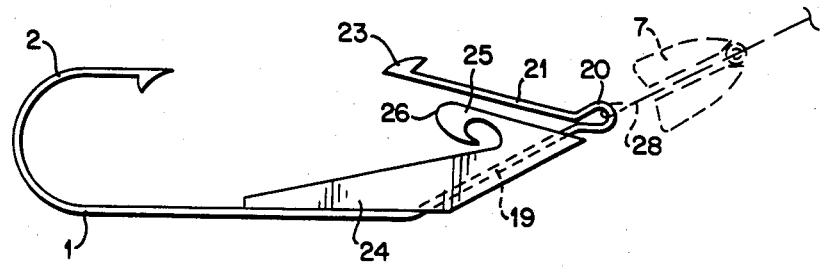

Referring now to FIG. 8, there is shown a still further exemplary embodiment of the invention wherein a lead-headed jig is again formed with a barbed wire keeper, but wherein a cooperating keeper is also formed on the lead weight. In this embodiment, the first straight shank portion 1 extends along the weight 24, while a connecting portion 19 extends through the weight to form an attachment loop 20 at the point where it exits from the weight. A second shank portion 21 extends from the loop, in a direction generally toward the hook 2, terminating in an outwardly directed barb 23. The weight 24 has a cooperating, inwardly formed barb 26 formed on a worm retaining portion 25 which extends generally parallel to the second shank portion 21. It will be understood that barbs 23 and 26 serve to hold a worm or other bait to the jig structure.

As in the embodiment illustrated in FIG. 7, the shank portion 21 extends along the weight 24, separated therefrom by a relatively small distance, preferably less than the thickness of a strand. In this way, a strand 27 may be pulled through this space and into the loop 20.

An optional, bullet-shaped sinker 27 is shown slidably mounted on the strand 28 adjacent the lead-headed jig.

It will therefore be appreciated that according to the present invention, simple yet effective integral structures are provided for ready, knotless attachment to strands. The structures are easy to manufacture and use, and can be utilized by virtually all segments of the population. While the invention has herein been shown and described in what is presently conceived to be the most practical and preferred embodiments thereof, it will be apparent to those of ordinary skill in the art that many modifications may be made which nevertheless remain within the scope of the invention, which scope is to be accorded the broadest interpretation of the appended claims so as to encompass all equivalent structures, devices and methods.

What is claimed is:

1. An integral fishing device structure for ready, knotless attachment to a strand, said structure comprising:
    a first forward end comprising a fish hook;
    first and second shank portions offset from each other and separated by a connecting portion, said second shank portion terminating at a second rearward end which faces generally toward said first forward end;
    a weight securely fastened to said connecting portion and said first shank portion, said weight comprising a lead ball formed with a strand wrapping projection thereon; said second shank portion spaced from said wrapping projection by a distance less than the thickness of the strand; and
    said structure further provided with an open loop between said lead ball and said second shank portion, wherein said strand wrapping projection and said open loop comprise means for permitting secure but knotless attachment to a strand.

2. A structure as defined in claim 1 wherein said second rearward end is formed with a barb thereon.

3. A lead-headed jig structure for attachment to a fishing line comprising a one-piece continuous wire member formed with a fish hook at one end and a bait retainer at the other end, said wire member between said hook and said bait retainer having first and second shank portions interconnected by an angled portion mounting a lead weight member, and an open loop formed between said lead weight member and said second shank portion, wherein said lead weight member is generally ball-shaped with an integrally formed, generally inverted conical projection thereon.

4. A lead-headed jig as recited in claim 3 wherein a portion of said second shank portion is spaced from said lead weight member a distance less than the thickness of said fishing line.

5. A lead-headed jig is recited in claim 3 wherein said bait retainer is formed by the second shank portion and a reverse bend wire barb formed at a free end thereof.

6. A lead-headed jig structure for attachment to a fishing line comprising a one-piece continuous wire member formed with a fish hook at one end and a bait retainer at the other end, said wire member between said hook and said bait retainer having first and second shank portions interconnected by an angled portion mounting a lead weight member, and an open loop formed between said lead weight member and said second shank portion, wherein said bait retainer is formed by the second shank portion and a reverse bend wire barb formed at a free end thereof.

7. A lead-headed jig as recited in claim 6 wherein said lead weight member is irregularly shaped, having a portion which extends generally parallel to said second shank portion and which terminates in a lead bait retaining barb.

8. A lead-headed jig as recited in claim 7 wherein said wire barb and said lead barb extend away from each other.

9. An integral fishing device structure for ready, knotless attachment to a strand, said structure comprising:
    a first forward end comprising a fish hook;
    first and second shank portions offset from each other and separated by a connecting portion, said second shank portion terminating at a second rearward end;
    a weight securely fastened to said connecting portion and said first shank portion, said weight being irregularly shaped, having a portion formed therein which extends generally parallel to said second shank portion, and which terminates in a first bait retaining barb;
    an open loop formed between said weight and said second rearward end, wherein said second shank portion extends from said connecting portion at an obtuse angle with respect to said first shank portion, and wherein said open loop terminates at a bend which is spaced from said weight by a distance less than the thickness of a strand.

10. A structure as defined in claim 9 wherein a loop is formed in said structure between said lead weight and said second shank portion, said second shank portion terminating in a second bait retaining barb.

11. A lead-headed jig structure for attachment to a fishing line comprising a one-piece continuous wire member formed with a fish hook at one end and a bait retainer at the other end, said wire member between said hook and said bait retainer having first and second shank portions interconnected by an angled portion mounting a lead weight member, and an open loop formed beteen said lead weight member and said second shank portion, wherein a portion of said second shank portion is spaced from said lead weight member a distance less than the thickness of said fishing line.

12. An integral fishing device structure for ready, knotless attachment to a strand, said structure comprising:
    a first forward end defining a fish hook;
    first and second shank portions offset from each other and separated by a connecting portion, said second shank portion terminating at a second rearward end;
    a weight securely fastened to said connecting portion and said first shank portion;
    means for permiting secure but knotless attachment of said structure to a strand, said means including at least one substantially closed loop located at said rearward end, said substantially closed loop permitting the strand to be drawn therein without threading; and said means further including
    a double open loop configuration located between said first forward end and said weight, one of said open loops opening in a direction away from said weight.

13. An integral fishing device structure for ready, knotless attachment to a strand, said structure comprising:
    a first forward end defining a working member;
    first and second substantially parallel shank portions offset from each other and separated by a connecting portion extending perpendicularly between said first and second shank portions, said second shank portion terminating at a second rearward end;
    a weight securely fastened to said connecting portion and said first shank portion; and means for permitting secure but knotless attachment of said structure to a strand, said means including at least one substantially closed loop located at said rearward end, said substantially closed loop terminating in a free end portion which overlies said second shank portion, permitting the strand to be drawn therein without threading, and said means further including a double open loop located between said first end and said weight, one of said open loops opening in a direction away from said weight.

14. An integral fishing device structure for ready, knotless attachment to a strand, said structure comprising:

a first forward end defining a fish hook;

first and second shank portions offset from each other and separated by a connecting portion, said shank portion terminating at a second rearward end;

a weight securely fastened to said connecting portion and said first shank portion;

means for permitting secure but knotless attachment of said structure to a strand, said means including at least one substantially closed loop located at said rearward end, said substantially closed loop prmitting the strand to be drawn therein without threading, and said means further including an open loop formed between said weight and said substantially closed loop at said second rearward end.

15. An integral fishing device structure for ready, knotless attachment to a strand, said structure comprising:

a first forward end defining a working member;

first and second substantially parallel shank portions offset from each other and separated by a connecting portion extending perpendicularly between said first and second shanks portions, said second shank portion terminating at a second rearward end;

a weight securely fastened to said connecting portion and said first shank portion; and means for permitting secure but knotless attachment of said structure a strand, said means including at least one substantially closed loop located at said rearward end, said substantially closed loop terminating in a free end portion which overlies said second shank portion, permitting the strand to be drawn therein without threading, and said means further including an open loop formed between said weight and said second shank portion.

16. An integral fishing device structure for ready, knotless attachment to a strand, said structure comprising:

a first forward end defining a fish hook;

first and second shank portions offset from each other and separated by a connecting portion, said second shank portion terminating at a second rearward end which faces generally toward said first forward end;

a weight securely fastened to said connecting portion and said first shank portion, said weight comprising a lead ball formed with a strand wrapping projection thereon; and means for permitting secure but knotless attachment of said structure to a strand, said means including at least one substantially closed loop located at said rearward end, said substantially closed loop permitting the strand to be drawn therein without threading, and said means further including an open loop formed between said lead ball and said second shank portion.

* * * * *